United States Patent [19]

Ross

[11] Patent Number: 4,653,393

[45] Date of Patent: Mar. 31, 1987

[54] APPARATUS FOR PEELING PINEAPPLES

[75] Inventor: Edward E. Ross, San Rafael, Calif.

[73] Assignee: Del Monte Corporation, San Francisco, Calif.

[21] Appl. No.: 867,181

[22] Filed: May 27, 1986

[51] Int. Cl.[4] .......................... A23N 4/20; A23N 7/00; A23N 7/08

[52] U.S. Cl. .......................................... 99/542; 99/544

[58] Field of Search ................. 99/539, 505, 515, 541, 99/542–545, 547, 584, 588, 593, 644; 30/300, 301; 83/651.1; 408/199, 200

[56]  References Cited

U.S. PATENT DOCUMENTS

| | | | |
|---|---|---|---|
| 1,060,750 | 5/1913 | Ginacia . | |
| 3,540,503 | 11/1970 | McNair . | |
| 4,246,700 | 1/1981 | Coulon et al. | 30/300 |
| 4,377,970 | 3/1983 | Kenkel | 99/572 |
| 4,441,413 | 4/1984 | Mori | 99/542 |
| 4,490,912 | 1/1985 | Hirano | 30/302 |
| 4,497,245 | 2/1985 | Mori | 99/542 |
| 4,546,545 | 10/1985 | Hirano | 99/543 X |

FOREIGN PATENT DOCUMENTS 764717 1/1957 United Kingdom .

Primary Examiner—Timothy F. Simone
Attorney, Agent, or Firm—Herbert J. Bluhm

[57] ABSTRACT

Apparatus for removing the peel from a pineapple comprises a tubular knife provided with a toothed cutting edge designed to cut through a pineapple and fixed elongated guide means telescopically positioned within the tubular knife and adapted to direct the toothed cutting edge toward a pineapple that is interposed between the guide means and a cutting pad positioned in opposing relationship to the toothed cutting edge. The mechanism for moving the tubular knife towards the cutting pad and through the body of a pineapple includes leveraged means designed to reduce the force required to move the tubular knife through the pineapple. The elongated guide means is adapted to accommodate quickly interchangeable caps which increase the effective diameter of the guide means and which cooperate with annular spacer elements mounted on the inside wall of a tubular knife. This allows the apparatus to be used with different diameter tubular knives for different size pineapples. The apparatus is also provided with a removable core tube slidably disposed in a passageway extending through the elongated guide means and designed to cut through the central core of a pineapple. The core tube and the tubular knife are coupled together by a removable connecting pin and are moved in concert by a force applied to the leveraged means. The cutting pad is provided with suitable structural features designed to accommodate the respective cutting tips of the core tube and tubular knife while at the same time presenting adequate surface areas for opposing the body of a pineapple pressed against it.

25 Claims, 7 Drawing Figures

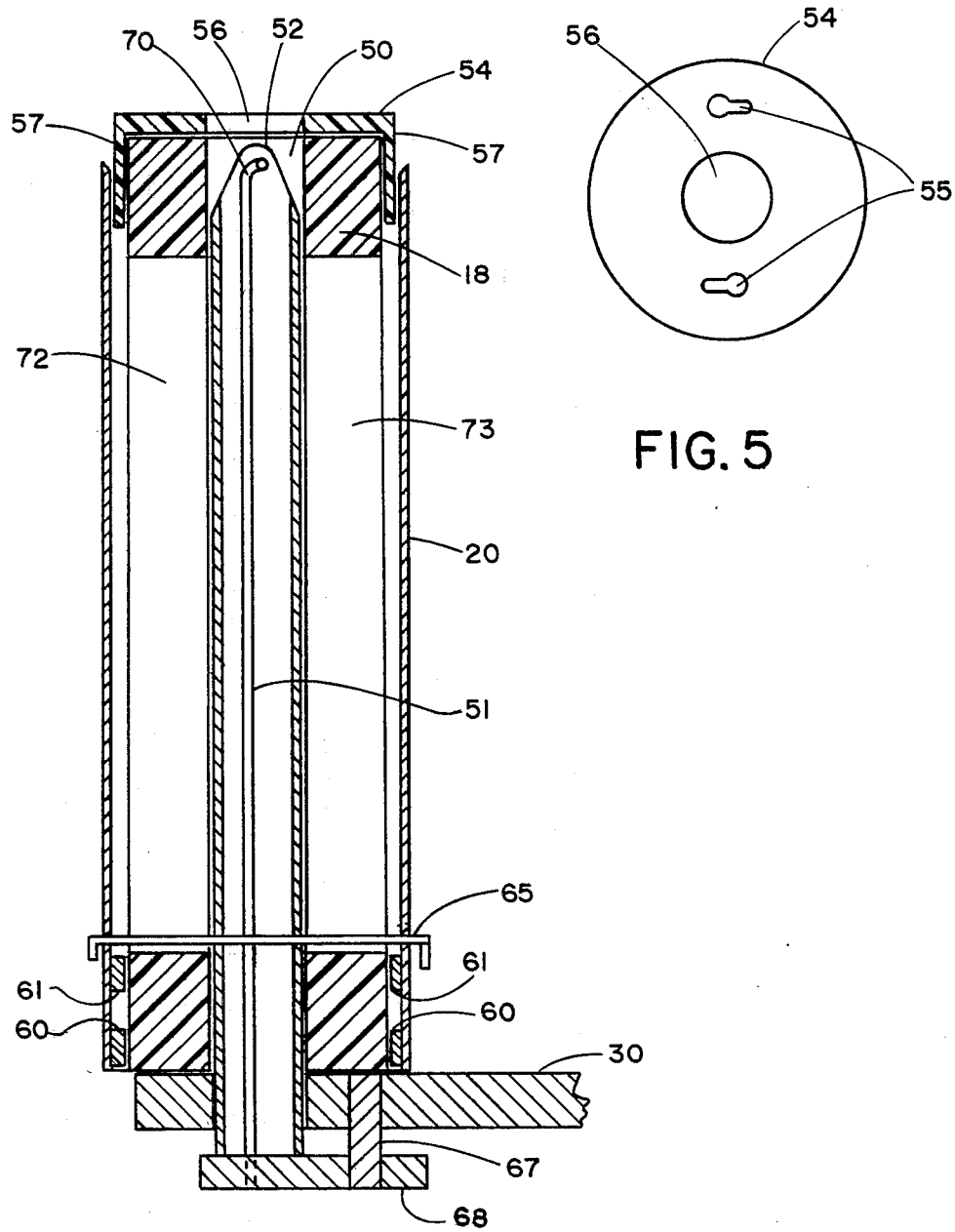

APPARATUS FOR PEELING PINEAPPLES

TECHNICAL FIELD

This invention relates to apparatus for peeling and coring fresh pineapples.

BACKGROUND OF THE INVENTION

The universal appeal of fresh fruits is readily confirmed by the large consumer demand that exists for such products. The most popular fruits are those which can be prepared for consumption with little effort on the part of the consumer. The popularity of pineapples in the fresh fruit market has been somewhat limited, therefore, due to the difficulties consumers have in removing the thick, hard shells from pineapples and separating the edible flesh from the cores of the pineapples.

Devices for peeling and/or coring pineapples and intended for use by the consumer have been described in the art. For example, U.S. Pat. Nos. 4,546,545, 3,540,503 and 4,490,912 describe hand-held devices for peeling and coring pineapples. Somewhat more elaborate apparatus for performing this task is disclosed in U.S. Pat. Nos. 4,441,413 and 4,497,245 as well as U.K. Pat. No. 764,717. The devices disclosed in these patents, however, are not entirely satisfactory for various reasons relating to operational aspects thereof. The operational aspects are particularly important because such devices are generally employed by inexperienced users.

Many of the shortcomings of prior art devices are overcome by the pineapple peeling and coring device disclosed in U.S. patent application Ser. No. 742,455 filed June 7, 1985, now U.S. Pat. No. 4,606,263. That device employs a tubular cutter provided with a toothed cutting edge that is pressed into a pineapple while it is supported on a cutting pad. Movement of the tubular cutter into the pineapple is accomplished by the operator grasping a pair of handles mounted on the wall of the tubular cutter and applying sufficient force in the direction of the cutting pad. The fact that the device is intended for use by a relatively large number of operators has proven to be a drawback, however, in that some operators lack the physical strength to apply the required force to the tubular cutter.

SUMMARY OF THE INVENTION

The present invention constitutes an improvement of the device disclosed in the above-mentioned U.S. Pat. No. 4,606,263 by providing leveraged action for peeling and coring a pineapple. Several of the design features disclosed in the earlier application have been retained in the present improved device. Accordingly, the teachings contained in U.S. Pat. No. 4,606,263 which apply also to this improved device are incorporated herein by reference.

An object of this invention is to provide an improved design for a pineapple peeling device which allows quick and easy replacement of a tubular knife with tubular knives having different diameters in order to peel pineapples of different sizes.

A further object is to provide an improved design for a cutting pad which exhibits increased strength and enhances the cutting action of the tubular knife as it meshes with the cutting pad.

An additional object of the invention is to provide a pineapple peeling device which facilitates removal and collection of the hard shell or peel during normal operation of the apparatus.

This invention basically comprises an essentially fixed elongated guide means oriented in a substantially vertical position and telescopically disposed within a substantially cylindrical tubular knife that is provided with a toothed cutting edge pointing upwardly, a stationary cutting pad positioned in opposing relationship to and spaced a sufficient distance above the upper ends of the elongated guide means and the tubular knife to permit a pineapple to be interposed between the cutting pad and the guide means, and leveraged means for moving the substantially cylindrical tubular knife upwardly towards the stationary cutting pad to cause the toothed cutting edge to engage the pineapple and to force it against the cutting pad with sufficient force to move the toothed cutting edge through the pineapple.

In a preferred embodiment the elongated guide means is provided with a passageway extending therethrough along its longitudinal axis and designed to accommodate a substantially cylindrical core tube slidably positioned in the passageway. The core tube is provided with a pointed cutting tip that faces upwardly and the leveraged means which moves the substantially cylindrical tubular knife is also employed to move the core tube upwardly toward the cutting pad thereby forcing the tubular knife and core tube through a pineapple interposed between the cutting pad and the tubular knife and core tube.

DRAWINGS

FIG. 4 is a cross-sectional view of the guide means, tubular knife and core tube showing details of their assembly and cooperating relationship.

FIG. 5 is a top plan view of a cap designed for quick installation on the upper end of the guide means employed with the apparatus of this invention.

DETAILED DESCRIPTION OF THE INVENTION

Figure 1:
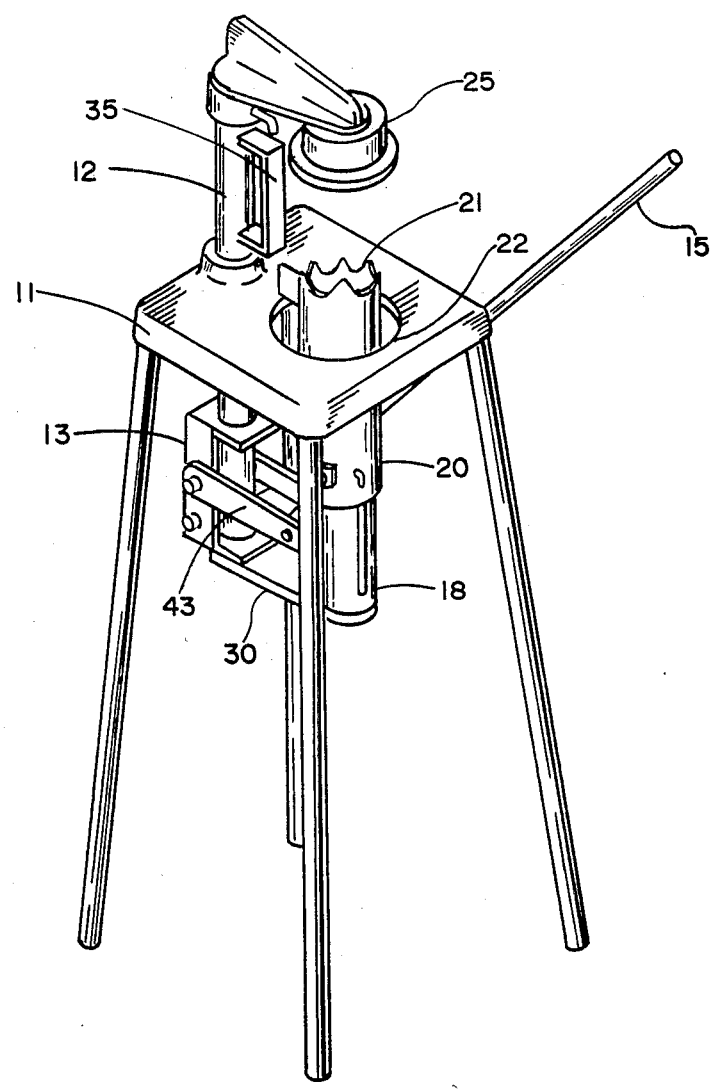
FIG. 1 is a perspective view of a pineapple peeling and coring device in accordance with the present invention.

The fresh pineapple peeling and coring device disclosed herein incorporates certain improvements over previously disclosed devices and provides for enhanced ease of operation through the use of leveraged means which forces the peeling and coring tubes through the pineapple. The basic apparatus for removing the peel from a pineapple comprises (a) an elongated, substantially cylindrical tubular knife provided with a toothed cutting edge that is designed to cut through the pineapple, (b) elongated guide means telescopically positioned within the elongated, substantially cylindrical tubular knife and provided with first support means for maintaining the guide means in a substantially fixed position, (c) a cutting pad positioned in opposing relationship to the toothed cutting edge of the tubular knife and spaced a sufficient distance therefrom to permit a pineapple to be interposed between the cutting pad and the toothed cutting edge, and (d) leveraged means for directing the tubular knife towards the cutting pad with sufficient force to move the toothed cutting edge through the body of the pineapple.

In a preferred embodiment of this device the elongated guide means and the elongated, substantially cylindrical tubular knife are oriented with their longitudinal axes in a substantially vertical position with the toothed cutting edge of the tubular knife facing upwardly. The upper end of the guide means is designed to support a pineapple placed thereon. As the leveraged means moves the toothed edge of the tubular knife upwardly towards the cutting pad, the pineapple is lifted from the upper end of the guide means by the toothed cutting edge of the tubular knife and is directed against the opposing cutting pad with sufficient force to permit the toothed cutting edge to penetrate and pass through the body of the pineapple. The pineapples which are processed in this manner must, of course, first have their crowns removed to prevent interference with the cutting operation. In actual practice both the top and bottom portions of a fresh pineapple are preferably removed by making appropriate cuts that are essentially perpendicular to the longitudinal axis of the pineapple core. Subsequent processing of the trimmed pineapple using the presently disclosed device produces a cylindrically shaped body that, except for the core, is essentially trimmed edible flesh of the pineapple.

The removal of the hard shell or peel which circumferentially surrounds the tubular knife after penetrating through the body of the pineapple is facilitated by slitting the peel. This is accomplished by providing the tubular knife with a knife blade that is affixed to the outer wall of the tubular knife adjacent to its toothed cutting edge and projecting radially outwardly a sufficient distance to slit completely through the peel of any pineapple presented for processing. The outer wall of the tubular knife is also provided with a peel tilt pin which is mounted at an appropriate location with respect to the slitting knife blade so that the peel tilt pin will engage the pineapple peel at a point near the slit as the knife blade completes its movement through the peel. The peel tilt pin applies a distorting force on the slit peel and causes it to tilt with respect to the elongated, substantially cylindrical body. This tilting action effectively releases the peel from the frictional forces which tend to adhere the slit peel to the outer wall of the tubular knife. As the tubular knife is returned to its rest position, the tilting and slit peel falls away from the cylindrical body under the influence of gravity. The falling peel can easily be collected in a suitable receptacle positioned below the peeling device.

In a further preferred embodiment the pineapple peeling device disclosed herein is also provided with a core tube which is designed to remove the hard central portion of the pineapple. This is accomplished by providing the elongated guide means with a passageway extending therethrough along its longitudinal axis and designed to accommodate a core tube slidably positioned in that passageway. The elongated, substantially cylindrical core tube positioned in the passageway is provided with a pointed cutting tip that is facing upwardly in opposing relationship to the cutting pad. The leveraged means which moves the tubular knife is also employed to move the elongated, substantially cylindrical core tube towards the cutting pad with sufficient force to enable the core tube to pass through a pineapple interposed between the cutting pad and the upper end of the guide means.

The lengths of the elongated guide means and the substantially cylindrical tubular knife and core tube should be sufficient to accommodate the largest pineapples that will be processed by the device. Generally, lengths of about 10 to 15 inches are adequate for the elongated guide means and the lengths of the peeling and coring tubes are selected so that their pointed cutting tips descend below the upper end of the elongated guide means when the tubular knife and core tube are positioned in their fully retracted or "rest" positions. The number of pointed cutting tips on the tubular knife and core tube is not critical. It has been found that 5 to 8 cutting tips on the tubular knife and 1 or 2 cutting tips on the core tube give satisfactory results. It is preferred that the tubular knife and core tube be provided with suitable diametrically opposed apertures in their respective lower portions to accommodate a connecting pin or shaft inserted in the apertures. Thus, operation of leveraged means connected to the tubular knife will effectively cause the core tube to move in concert with the peeling tube. The elongated guide means is provided with appropriate slots through which the connecting pin or shaft moves, the slots extending longitudinally within the body of the elongated guide means a sufficient distance to allow the cutting edges of the tubular knife and core tube to pass completely through the body of a pineapple being processed. The use of a connecting pin or shaft for coupling the tubular knife and core tube permits the presently disclosed device to be used for removing only the hard shell or peel of the pineapple. This is achieved by operating the device with the core tube removed.

When the device is operated with the tubular knife and core tube coupled together, suitable means must be employed to eject the pineapple core from the core tube. It is preferred that an ejector rod attached to stationary support means at its lower end be used for that purpose. The ejector rod must be positioned in the central cavity of the core tube and extend to a point near the cutting tip of the core tube. As the core tube is withdrawn from a pineapple, the core ejector rod forces the pineapple core from the core tube resulting in the pineapple core being left in the peeled and cored pineapple. The pineapple core can be easily removed from the peeled and cored pineapple by the consumer of the fruit.

One of the unique features of the present invention is the capability of processing pineapples of different sizes. Due to differences in the diameters of mature pineapples, it is desirable to use a tubular knife having an inside diameter that will produce the maximum amount of edible fruit but yet will remove substantially all of the outer hard shell or peel. The presently disclosed apparatus is adapted to accommodate tubular knives having different inside diameters. This is accomplished by providing the upper end of the elongated guide means with means for receiving quickly interchangeable caps having different diameters. Each cap is designed to cooperate with a particular diameter tubular knife. The caps may assume a variety of shapes so long as the maximum effective diameter of each cap is at least 96 percent and preferably at least 98 percent of the inside diameter of the substantially cylindrical tubular knife that is to be used with a particular cap. For example, the cap may take the form of a disk having an appropriate diameter and sufficient thickness to provide the necessary guidance for the tubular knife which slides telescopically along the outer peripheral surface of the disk. Alternatively, the cap may be cup-shaped with a cylindrical outer periphery that is in slidable contact with the surrounding cylindrical tubular knife. Regardless of the particular form of cap that is used, the upper end of the elongated guide means must be provided with means for retaining the installed cap in a fixed position. Such retaining means may, for example, be a pair of screws inserted in suitable apertures in the cap and anchored in the upper end of the elongated guide means.

While the cap installed on the upper end of the elongated guide means serves to position and to guide the upper portion of the cylindrical tubular knife, the lower portion of the tubular knife must also be positioned and guided. This is preferably done by installing annular spacer elements on the inside wall of each tubular knife near its lower end. These annular spacer elements remain attached to each tubular knife and the radial thickness of the spacer elements is selected to complement the increase in effective diameter of the elongated guide means that is provided by the particular cap used. At least one and preferably two annular spacer elements are installed on the inside wall of each tubular knife and it is important that the maximum effective transverse dimension of the elongated guide means be at least 96 percent and preferably at least 98 percent of the effective inside diameter of the annular spacer elements. Thus, the vertical movement of each substantially cylindrical tubular knife involves sliding contact between the inside wall of the tubular knife and the outer peripheral surface of the cap affixed to the upper end of the elongated guide means as well as between the vertical outer wall surface of the elongated guide means and the radially inward wall surface of the annular spacer element(s). Due to the acidic nature of pineapples, it is preferred that the elongated guide means, the cap and the annular spacer elements be fabricated from a suitable thermoplastic material such as high density polyethylene.

The leveraged means for moving the substantially cylindrical tubular knife and, optionally, the core tube may comprise a variety of arrangements. One preferred arrangement involves the use of gear means connected to the lower portion of the tubular knife by suitable activator arms with the gear means being actuated by a shaft having sufficient length to provide the desired degree of leverage. It has been found that a shaft providing 4 to 1 leveraged action is adequate to permit ease of operation in the processing of pineapples using the presently disclosed device. Since the tubular knives used with this apparatus must be quickly interchangeable to accommodate different size pineapples, each tubular knife is provided with two connector spindles mounted on opposite sides of the peeling tube near its lower end. The linkage between the tubular knife and the gear means preferably includes for each connector spindle an activator arm having a first end affixed to a shaft associated with the gear means and a connecting rod having one end that is pivotally connected to the end of the activator arm that is remote from the gear means shaft. The other end of each connecting rod is pivotally connected to each of the connector spindles mounted on the peeling tube.

The location of the gear means and the linkage connecting the gear means with the spindles on the peeling tube is such that the pivoting connecting rods are in a substantially vertical position. The actual orientation of the connecting rods varies somewhat during the course of travel of the peeling tube due to the curvature of the arc defined by the end of the activator arm that is remote from the gear means as the arm moves upwardly and downwardly. Thus, the force applied to the connector spindles is precisely in the vertical direction at only one point during the movement of the activator arms through their limits of travel. Since the elongated guide means can only be supported by fixed means at its lower end, the non-vertical component of the force applied to the connector spindles on the tubular knife imparts a certain degree of lateral movement to the upper end of the tubular knife and the elongated guide means located within the tubular knife. This tendency toward lateral movement of the upper end of the elongated guide means is exacerbated by the knife blade affixed to the outer wall surface of the tubular knife which gives rise to a resisting force that is concentrated on the side of the tubular knife carrying the knife blade. In order to minimize this tendency toward lateral movement of the upper end of the elongated guide means, it is desirable to provide stabilizing means capable of restricting such lateral movement without interfering with the normal vertical movement of the peeling tube. For example, such stabilizing means may comprise a stationary, vertically disposed plate positioned adjacent to the vertical path of the knife blade affixed to the tubular knife. This plate is provided with a smooth surface designed to allow the side of the knife blade to slide along that surface as the knife blade cuts through the peel of a pineapple being processed. It is apparent that other types of stabilizing means could also be employed to provide the desired stability of operation.

The design of the cutting pad constitutes another important aspect of the present invention. In a preferred embodiment the cutting pad is adjustably mounted in an opposing position to the cutting edges of the tubular knife and core tube. The cutting pad is preferably fabricated from a corrosion-resistant material such as polyethylene and is provided with a central substantially cylindrical projection which is aligned with the central cavity of the core tube and is designed to present an opposing surface to the core portion of a pineapple brought into contact therewith. Concentrically surrounding and spaced from the central projection is an annular projection which defines a first annular recess or groove therebetween for receiving the pointed cutting tip of the core tube. A peripheral rim concentrically surrounding and spaced from the annular projection defines a second annular recess or groove between the rim and the annular projection for receiving the toothed cutting edge of the tubular knife. This second annular recess must have a radial dimension that is sufficiently large to accommodate the different diameter tubular knives that are interchangeably used with this device. Both the first and second annular recesses must have sufficient depth to allow the pointed ends of the tubular knife and core tube to cut completely through the body of a pineapple being processed. The rim of the cutting pad, which concentrically surrounds the outer annular groove, must be provided with a suitable recess into which the peel-slitting knife blade extends as the tubular knife makes its maximum penetration into the second annular recess. It has been found that the structural strength of the cutting pad and its effectiveness in the pineapple cutting operation are significantly improved by providing a plurality of spokes which are connected to and extend radially between the rim structure of the cutting pad and the annular projection located between the annular recesses. The number of spokes and their location depends to some extent on the design of the toothed cutting edge on the tubular knife. It is preferred that the spokes be located in opposing positions to the portions of the toothed cutting edge that are approximately midway between adjacent teeth. If the substantially circular toothed cutting edge of the tubular knife is provided with six equidistantly spaced teeth or pointed cutting tips, it is desirable to have six equidistantly spaced spokes in the cutting pad. From a position where the points of the toothed cutting edge and the spokes are in direct opposition, the cutting pad is rotated approximately 30 degrees and subsequently fixed in that position relative to the tubular knife during normal operation of the device. This permits the pointed cutting tips of the tubular knife to complete their travel through the body of the pineapple and yet avoid direct contact between the cutting tips and the cutting pad spokes. The spokes, on the other hand, provide sufficient additional opposing cutting pad surface in the area of the outer annular recess to restrain the body of the pineapple while the cutting edge of the tubular knife completes its path through the pineapple. Thus, the spokes in the cutting pad enhance the cutting operation of the presently disclosed device and produce a cleaner cut in the trimmed pineapple.

It is important that relative rotation between the tubular knife and the cutting pad be minimized in order to avoid bringing the pointed cutting tips of the peeling tube into direct confrontation with the spokes in the cutting pad. The cutting pad can be firmly anchored and poses no problem in this regard. The tubular knife, however, is subjected to certain rotational forces as its cutting edge and the attached peel-slitting knife blade encounter areas of variable resistance to cutting in the body and peel of the pineapple. Therefore, it is desirable that the device be operated at all times with the previously mentioned connecting pin or shaft installed in the lower portion of the tubular knife. Since this connecting pin extends through the longitudinally disposed slots in the stationary, elongated guide means, rotation of the tubular knife is effectively prevented. The connecting pin is, of course, used when coring of the pineapple is to be accomplished in conjunction with the peeling operation. When coring of the pineapple is not desired, it is advantageous to remove the core tube from the apparatus so that the apparatus can be operated with the connecting pin installed in the tubular knife.

For a more complete understanding of the present invention, reference will now be made to the accompanying drawings.

Figure 2:
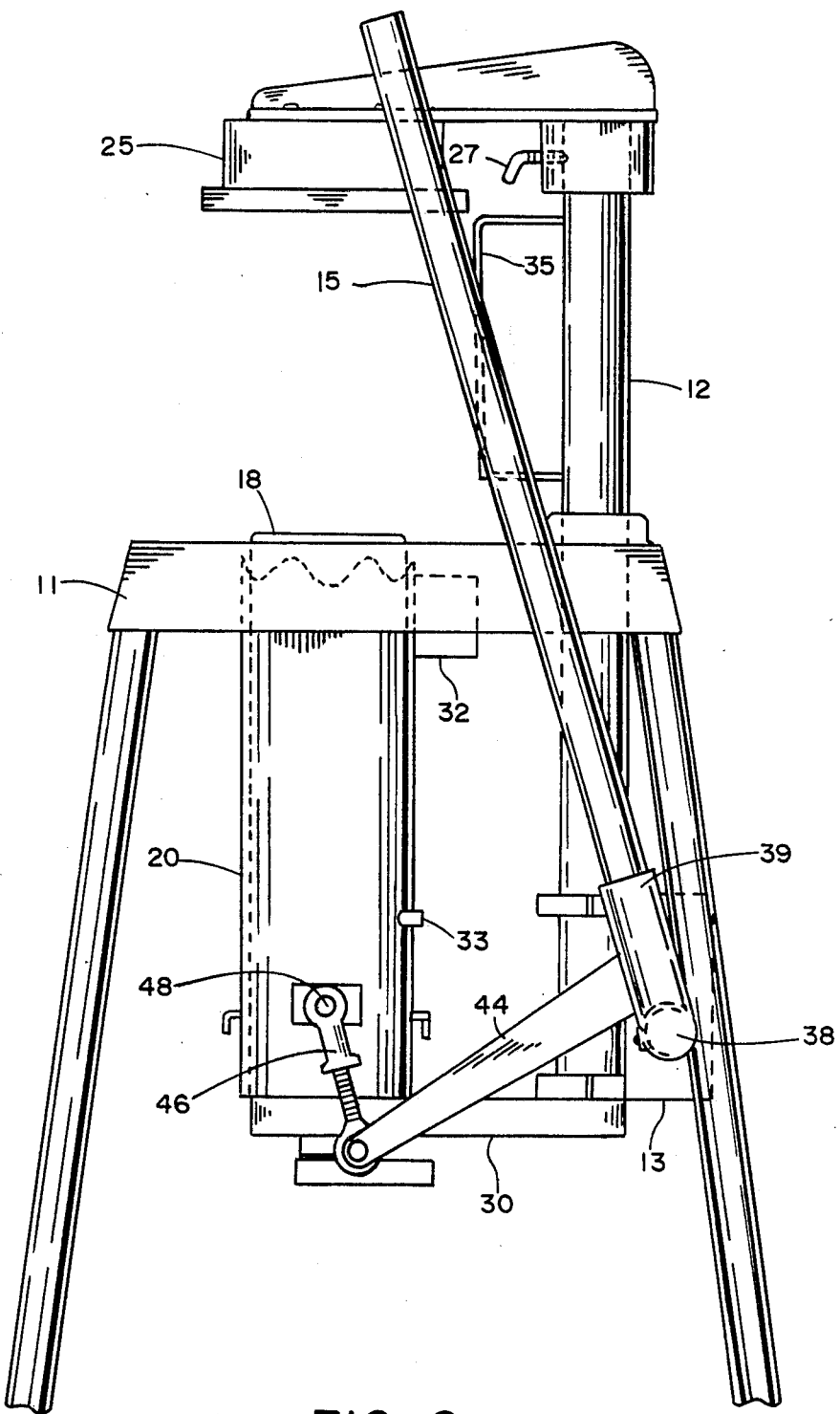
FIG. 2 is a side elevational view of the device shown in FIG. 1.
Figure 3:
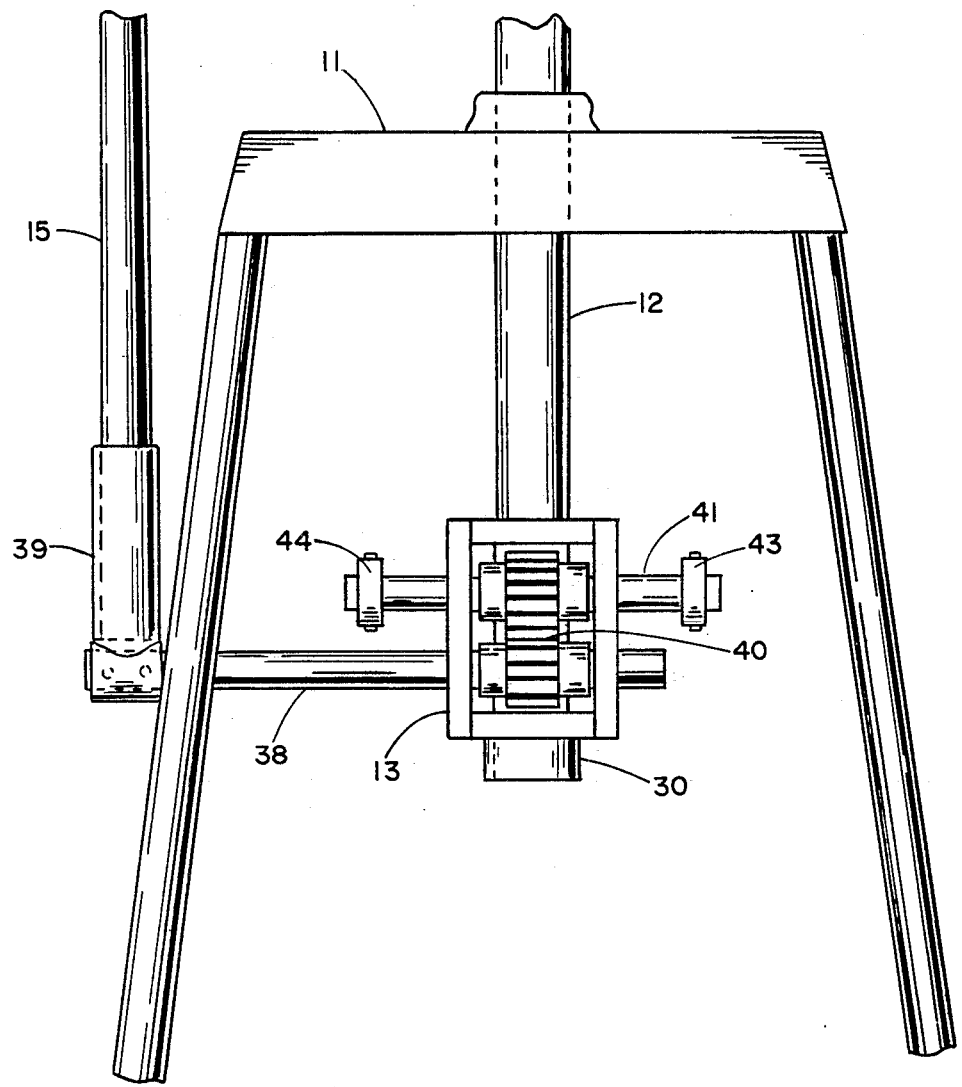
FIG. 3 is a rear elevational view of a portion of the FIG. 1 device showing details of the gear means employed in the leveraged action of the device.

Shown in FIGS. 1, 2 and 3 is a preferred embodiment of the present invention wherein table 11 is provided with a large opening 22 in the horizontal surface of the table. Extending through a second smaller opening and securely affixed to the horizontal table surface is support column 12. Adjustably attached to the upper end of support column 12 by set screw 27 is cutting pad 25 and its associated mounting bracket. Firmly secured to the lower end of support column 12 is support bracket 30 on which elongated guide means 18 is mounted. Tubular knife 20 telescopically surrounds guide means 18 and is provided at its upper end with a toothed cutting edge 21. Welded to the outer wall of tubular knife 20 adjacent to the toothed cutting edge is peel-slitting knife blade 32. Located below knife blade 32 and not aligned therewith is peel tilt pin 33 which is also welded to the outer wall of tubular knife 20. Affixed to support column 12 and extending vertically along the path of knife blade 32 is knife blade guide 35.

Bolted to support column 12 immediately above support bracket 30 is gear box 13. Spur gears 40 are mounted on lower gear shaft 38 and upper gear shaft 41. Attached to the end of the lower gear shaft 38 is lever socket 39 which is designed to receive lever 15 inserted therein. Attached to upper gear shaft 41 are tubular knife support arms 43 and 44. The end of support arm 44 that is remote from upper gear shaft 41 is provided with an aperture for pivotally linking support arm 44 with one end of connecting rod 46. The other end of connecting rod 46 is pivotally linked to spindle 48 attached to the wall of tubular knife 20. Support arm 43 is similarly linked to a second spindle (not shown) attached to tubular knife 20 opposite spindle 48. Connecting rod 46 is preferably designed so that adjustments can be quickly made in its length.

FIG. 4 presents a cross-sectional view of elongated guide means 18, tubular knife 20 and core tube 51. In the embodiment shown guide means 18 is adapted for use with a tubular knife having a significantly greater inside diameter than the maximum transverse dimensions of guide means 18. A cup-shaped cap 54 is installed on the upper end of guide means 18 and retained thereon by two screws (not shown) anchored in the upper end of guide means 18 and screw slots 55 (see top plan view in FIG. 5). Cap 54 is also provided with a central opening 56 aligned with the core tube passageway 50 and designed to allow core tube 51 to move through opening 56. The outside diameter of cap 54 is designed to complement annular spacer elements 60 and 61 installed on the inside wall of tubular knife 20 adjacent its lower end. Thus, the dimensions of cap 54, tubular knife 20 and annular spacer elements 60 and 61 are selected so that annular spacer elements are in sliding contact with the outside wall surface of guide means 18 and the outside wall surface 57 of cap 54 is in sliding contact with the inside wall of tubular knife 20. Core tube 51 is provided with a pointed cutting tip 52 and two diametrically opposed apertures through which core tube 51 is coupled to tubular knife 20 by removable connecting pin 65. When connecting pin 65 is removed for installation of a tubular knife of different size, the core tube is temporarily supported by lower support bracket 68 which is held in fixed position by support mast 67. Installed in lower support bracket 68 is the lower end of core ejector rod 70 which forces pineapple cores from the core tube 51 as the tubular knife/core tube assembly is lowered to its rest position. Elongated guide means 18 is provided with narrow, elongated slots 72 and 73 through which connecting pin 65 moves as tubular knife 20 is raised and lowered.

Figures 6, 7:
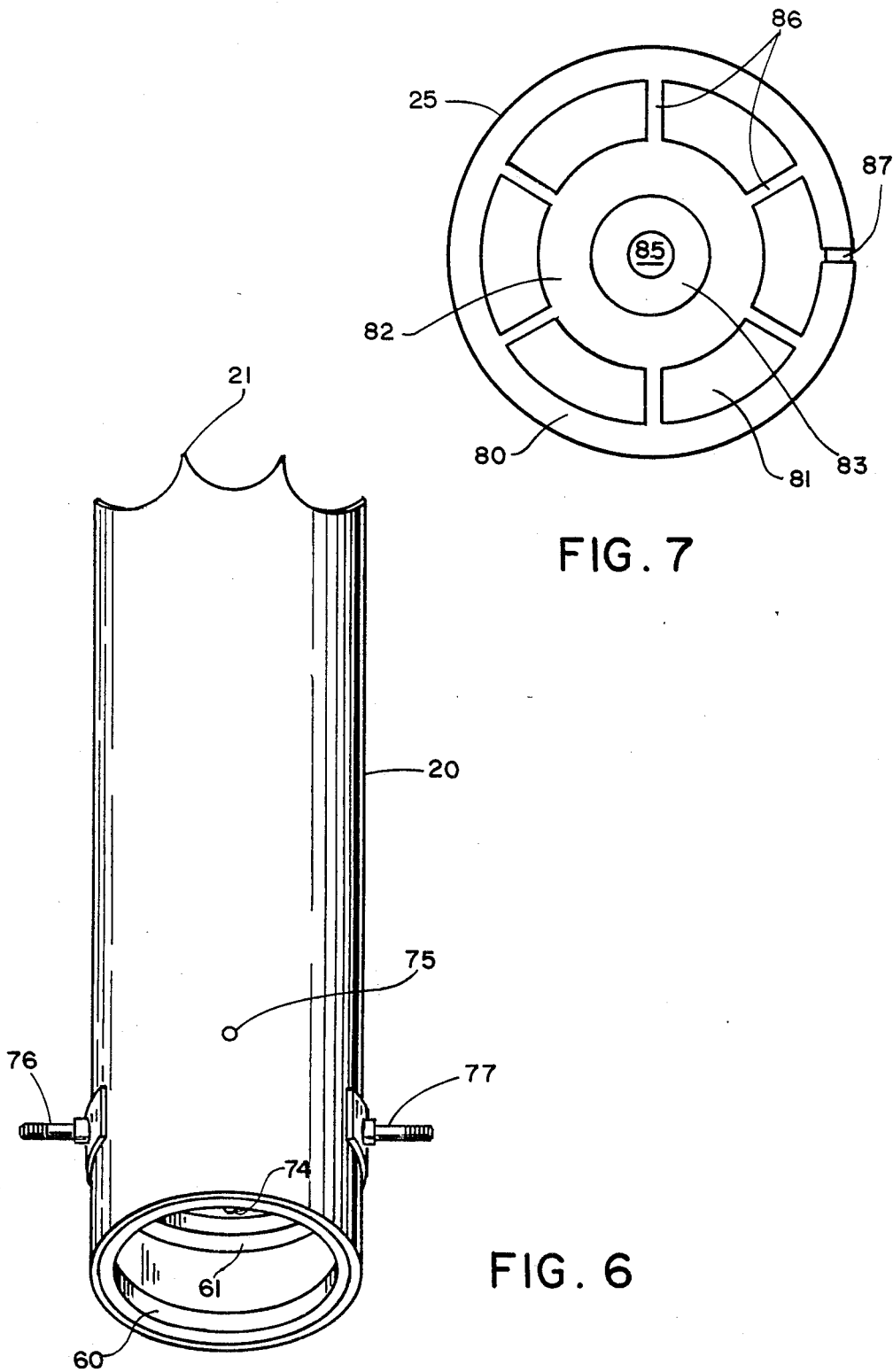
FIG. 6 is a perspective view of a tubular knife designed for use with the present invention and showing annular spacer elements installed on the inner wall of the knife.
FIG. 7 is a plan view of a cutting pad used with the present invention showing the design of the surface which contacts a pineapple in opposing fashion.

Shown in FIG. 6 is a tubular knife provided with annular spacing elements 60 and 61 installed on the inside wall of the knife remote from the toothed cutting edge 21. Spindles 76 and 77 securely attached in diametrically opposed fashion to the lower portion of tubular knife 20 provide the means for connecting the tubular knife to the knife support arms and gear box. Apertures 74 and 75 accommodate the connecting pin which couples the tubular knife 20 with core tube 51 (FIG. 4).

FIG. 7 presents a plan view of the cutting pad surface which contacts the pineapple being processed. Disposed between peripheral rim 80 and annular projection 82 is annular groove or recess 81 which is designed to receive the cutting edge of tubular knife 20. Central projection 85 is designed to present an opposing surface to the core portion of a pineapple being forced against the cutting pad. Disposed between central projection 85 and annular projection 82 is annular recess 83 which is designed to receive the cutting tips of core tube 51. Radially spanning annular groove 81 are a plurality of equidistantly spaced spokes 86 which connect peripheral rim 80 with annular projection 82. Rim 80 is also provided with recess 87 which is positioned in the assembled peeling and coring device to receive the cutting edge of the knife blade attached to the outer wall of tubular knife 20.

In a typical operation of the presently disclosed device, set screw 27 is loosened so that cutting pad 25 can be temporarily moved aside to permit installation of the desired size tubular knife including the appropriate cap 54 if required. The core tube 51 (if core removal is desired) and the connecting pin 65 are installed in the device and cutting pad 25 is returned to its normal operating position. A pineapple is prepared for processing by removing the top and bottom portions of the fruit with manually performed transverse cuts that are substantially perpendicular to the longitudinal axis of the pineapple core. The trimmed pineapple is then placed on the upper end of elongated guide means 18 or cap 54 (if required). The tubular knife 20 and the core tube 51 (if installed) are then moved upwardly by lever 15. The trimmed pineapple is lifted from the elongated guide means or cap by the pointed cutting edges of the tubular knife and core tube. As the pineapple body is pressed against stationary cutting pad 25, the cutting edges of the tubular knife and core tube move through the body of the pineapple and into annular recesses 81 and 83, respectively, in response to the force that is applied to lever 15. Incident to this movement, knife blade 32 makes sliding contact with knife blade guide 35 as blade 32 slits the peel of the pineapple. Following complete penetration of the body and slitting of the peel of the pineapple, lever 15 is raised thereby causing tubular knife 20 and core tube 51 to be lowered to their rest position. The slit peel of the pineapple slides down the outer wall of tubular knife 20 until it contacts pin 33 whereupon the peel tilts away from tubular knife 20 and falls by gravity into a suitable collector such as a plastic bag positioned below the knife assembly. Lowering of the core tube also results in the pineapple core being forced from the core tube by core ejector rod 70 so that the trimmed and peeled pineapple that is returned to the upper end of the elongated guide means or cap also contains the pineapple core which can be easily removed.

From the foregoing description it is apparent that the present invention is capable of achieving the goals and objectives set forth above. It is equally apparent that many variations could be made in this invention without departing from the basic concepts as exemplified by the disclosed preferred embodiments. Accordingly, such variations are deemed to fall within the scope of the claims which follow.

What is claimed is:

1. Apparatus for removing the peel from a pineapple comprising (a) an elongated, substantially cylindrical tubular knife provided with a toothed cutting edge that is designed to cut through a pineapple, the longitudinal axis of said tubular knife being substantially vertically oriented with said toothed cutting edge facing upwardly,
   (b) elongated guide means telescopically positioned within said tubular knife, said elongated guide means having an upper end designed to support a pineapple placed thereon and being provided with a first support means for maintaining the guide means in a substantially fixed position,
   (c) a cutting pad positioned in opposing relationship to and spaced a sufficient distance above said upper end of the elongated guide means to permit a pineapple to be interposed between the cutting pad and the upper end of the guide means,
   (d) leveraged means for moving said tubular knife upwardly towards said cutting pad with sufficient force to enable said toothed cutting edge to engage and to pass through a pineapple as it is pressed against said cutting pad.

2. The apparatus of claim 1 wherein the upper end of said elongated guide means is adapted to receive a removable cap having an effective diameter that is greater than the effective diameter of said elongated guide means and said tubular knife is provided with an annular spacer element affixed to the inside wall thereof remote from said toothed cutting edge, the dimensions of said removable cap and said annular spacer element being complementary.

3. The apparatus of claim 2 wherein the effective diameter of said removable cap is at least 96 percent of the inside diameter of said tubular knife and the effective transverse dimension of said elongated guide means is at least 96 percent of the inside diameter of said annular spacer element.

4. The apparatus of claim 1 which additionally includes a peel-slitting knife blade affixed to and projecting radially outwardly from the wall of said tubular knife adjacent to its toothed cutting edge.

5. The apparatus of claim 4 which additionally includes a stationary, vertically disposed plate positioned adjacent to the vertical path along which said peel-slitting knife blade moves, said plate being designed to engage and to restrict lateral movement of said knife blade and the tubular knife associated therewith without significantly impeding vertical movement of said knife blade.

6. The apparatus of claim 4 wherein said tubular knife is provided with a peel tilt pin affixed to and projecting outwardly from the outer wall of the tubular knife at a location that will bring said peel tilt pin into contact with a slit pineapple peel at a point that is spaced from but is near the slit in said pineapple peel.

7. The apparatus of claim 1 wherein said tubular knife is provided with two spindles secured to its outer wall and said leveraged means includes spur gears and two associated support arms pivotally linked to said two spindles which move the tubular knife along a substantially vertical path in response to a leveraged force applied to said spur gears.

8. The apparatus of claim 1 wherein said elongated guide means is provided with longitudinally extending slots within the body of the elongated guide means and said tubular knife is provided with two diametrically opposed apertures and a removable connecting pin installed in said apertures, said installed connecting pin being disposed in said longitudinally extending slots to restrict vertical and rotational movement of said tubular knife.

9. The apparatus of claim 1, 2, 3, 7 or 8 wherein said cutting pad is provided with an annular recess for receiving the toothed cutting edge of said tubular knife, said cutting pad also being provided with a plurality of radially extending spokes spanning said annular recess and spaced apart a sufficient distance to permit one or more points of the toothed cutting edge to be received in said annular recess in the area between adjacent spokes.

10. The apparatus of claim 9 wherein said cutting pad includes six spokes spaced approximately 60 degrees apart and said toothed cutting edge of the tubular knife includes six pointed cutting tips spaced approximately 60 degrees apart.

11. The apparatus of claim 4, 5 or 6 wherein said cutting pad is provided with an annular recess for receiving the toothed cutting edge of said tubular knife, said cutting pad also being provided with a plurality of radially extending spokes spanning said annular recess and spaced apart a sufficient distance to permit one or more points of the toothed cutting edge to be received in said annular recess in the area between adjacent spokes.

12. The apparatus of claim 11 wherein said cutting pad includes a peripheral rim provided with a radially extending slot adapted to receive the cutting edge of said peel-slitting knife blade.

13. Apparatus for removing the peel and core from a pineapple comprising
(a) an elongated, substantially cylindrical tubular knife provided with a toothed cutting edge that is designed to cut through a pineapple, the longitudinal axis of said tubular knife being substantially vertically oriented with said toothed cutting edge facing upwardly,
(b) elongated guide means telescopically positioned within said tubular knife, said elongated guide means having an upper end designed to support a pineapple placed thereon and being provided with a first support means for maintaining the guide means in a substantially fixed position, said elongated guide means also being provided with a passageway extending therethrough along the longitudinal axis of the guide means and designed to accommodate a core tube slidably positioned in said passageway,
(c) a cutting pad positioned in opposing relationship to and spaced a sufficient distance above said upper end of the elongated guide means to permit a pineapple to be interposed between the cutting pad and the upper end of the guide means,
(d) an elongated, substantially cylindrical core tube provided with a pointed cutting tip and slidably disposed in the passageway extending through said elongated guide means so that said pointed cutting tip is facing upwardly, and
(e) leveraged means for moving said tubular knife and said core tube upwardly towards said cutting pad with sufficient force to enable the toothed cutting edge associated with said tubular knife and the pointed cutting tip associated with said core tube to engage and to pass through a pineapple as it is pressed against said cutting pad.

14. The apparatus of claim 13 wherein the upper end of said elongated guide means is adapted to receive a removable cap having an effective diameter that is greater than the effective diameter of said elongated guide means and said tubular knife is provided with an annular spacer element affixed to the inside wall thereof remote from said toothed cutting edge, the dimensions of said removable cap and said annular spacer element being complementary.

15. The apparatus of claim 14 wherein the effective diameter of said removable cap is at least 96 percent of the inside diameter of said tubular knife and the effective transverse dimension of said elongated guide means is at least 96 percent of the inside diameter of said annular spacer element.

16. The apparatus of claim 13 which additionally includes a peel-slitting knife blade affixed to and projecting radially outwardly from the wall of said tubular knife adjacent to its toothed cutting edge.

17. The apparatus of claim 16 which additionally includes a stationary, vertically disposed plate positioned adjacent to the vertical path along which said peel-slitting knife blade moves, said plate being designed to engage and to restrict lateral movement of said knife blade and the tubular knife associated therewith without significantly impeding vertical movement of said knife blade.

18. The apparatus of claim 16 wherein said tubular knife is provided with a peel tilt pin affixed to and projecting outwardly from the outer wall of the tubular knife at a location that will bring said peel tilt pin into contact with a slit pineapple peel at a point that is spaced from but is near the slit in said pineapple peel.

19. The apparatus of claim 13 wherein said tubular knife is provided with two spindles secured to its outer wall and said leveraged means includes spur gears and two associated support arms pivotally linked to said two spindles which move the tubular knife along a substantially vertical path in response to a leveraged force applied to said spur gears.

20. The apparatus of claim 13 wherein said elongated guide means is provided with longitudinally extending slots within the body of the elongated guide means and said tubular knife and said core tube are each provided with two diametrically opposed apertures and a removable connecting pin installed in said apertures in the tubular knife and core tube, said installed connecting pin being disposed in said longitudinally extending slots to restrict vertical and rotational movement of said tubular knife and said core tube.

21. The apparatus of claim 13, 14, 15, 19 or 20 wherein said cutting pad is provided with a central substantially cylindrical projection designed to oppose the core of a pineapple brought into contact therewith, an annular projection concentrically surrounding and spaced from said central substantially cylindrical projection to define a first annular recess therebetween for receiving the pointed cutting tip of said core tube, a peripheral rim concentrically surrounding and spaced from said annular projection to define a second annular recess therebetween for receiving the toothed cutting edge of said tubular knife, and a plurality of radially extending spokes spanning said second annular recess and designed to oppose the body of a pineapple brought into contact therewith, said spokes being spaced apart a sufficient distance to permit one or more points of the toothed cutting edge to be received in said second annular recess in the area between adjacent spokes.

22. The apparatus of claim 21 wherein said cutting pad includes six spokes each extending from said annular projection to said peripheral rim and spaced approximately 60 degrees apart and said toothed cutting edge of the tubular knife includes six pointed cutting tips spaced approximately 60 degrees apart.

23. The apparatus of claim 16, 17 or 18 wherein said cutting pad is provided with a central substantially cylindrical projection designed to oppose the core of a pineapple brought into contact therewith, an annular projection concentrically surrounding and spaced from said central substantially cylindrical projection to define a first annular recess therebetween for receiving the pointed cutting tip of said core tube, a peripheral rim concentrically surrounding and spaced from said annular projection to define a second annular recess therebetween for receiving the toothed cutting edge of said tubular knife, and a plurality of radially extending spokes spanning said second annular recess and designed to oppose the body of a pineapple brought into contact therewith, said spokes being spaced apart a sufficient distance to permit one or more points of the toothed cutting edge to be received in said second annular recess in the area between adjacent spokes.

24. The apparatus of claim 23 wherein said peripheral rim is provided with a radially extending slot adapted to receive the cutting edge of said peel-slitting knife blade.

25. The apparatus of claim 24 wherein said cutting pad includes six spokes each extending from said annular projection to said peripheral rim and spaced approximately 60 degrees apart and said toothed cutting edge of the tubular knife includes six pointed cutting tips spaced approximately 60 degrees apart.

* * * * *